United States Patent
Panamarathupalayam et al.

(10) Patent No.: US 10,214,677 B2
(45) Date of Patent: Feb. 26, 2019

(54) BREAKER FLUIDS AND METHODS OF USE THEREOF

(71) Applicant: M-I L.L.C., Houston, TX (US)

(72) Inventors: Balakrishnan Panamarathupalayam, Houston, TX (US); Daniel Alvarez, Houston, TX (US); Thomas Donovan Welton, Conroe, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/400,354

(22) Filed: Jan. 6, 2017

(65) Prior Publication Data

US 2017/0198192 A1    Jul. 13, 2017

Related U.S. Application Data

(60) Provisional application No. 62/276,080, filed on Jan. 7, 2016.

(51) Int. Cl.

| | |
|---|---|
| *E21B 37/00* | (2006.01) |
| *C09K 8/52* | (2006.01) |
| *C09K 8/035* | (2006.01) |
| *E21B 37/08* | (2006.01) |
| *E21B 43/08* | (2006.01) |
| *E21B 43/10* | (2006.01) |
| *E21B 43/25* | (2006.01) |
| *C08F 220/56* | (2006.01) |
| *C09K 8/12* | (2006.01) |
| *G01V 3/20* | (2006.01) |
| *G01V 3/34* | (2006.01) |
| *C08F 220/54* | (2006.01) |
| *G01V 3/24* | (2006.01) |
| *C08F 212/14* | (2006.01) |
| *C08F 228/02* | (2006.01) |

(52) U.S. Cl.
CPC ............ *C09K 8/52* (2013.01); *C08F 220/54* (2013.01); *C08F 220/56* (2013.01); *C09K 8/035* (2013.01); *C09K 8/12* (2013.01); *E21B 37/00* (2013.01); *E21B 37/08* (2013.01); *E21B 43/082* (2013.01); *E21B 43/10* (2013.01); *E21B 43/25* (2013.01); *G01V 3/20* (2013.01); *G01V 3/24* (2013.01); *G01V 3/34* (2013.01); *C08F 212/14* (2013.01); *C08F 228/02* (2013.01); *C09K 2208/26* (2013.01)

(58) Field of Classification Search
CPC ........ C09K 8/68; C09K 2208/12; C09K 8/12; C09K 8/22; C09K 8/38; C09K 8/52; E21B 37/00; E21B 37/08; E21B 43/082; E21B 43/10; E21B 43/25
See application file for complete search history.

(56) References Cited

U.S. PATENT DOCUMENTS

| | | |
|---|---|---|
| 7,066,260 B2 | 6/2006 | Sullivan et al. |
| 8,835,364 B2 | 9/2014 | Thompson et al. |
| 2008/0200354 A1 | 8/2008 | Jones et al. |
| 2009/0114394 A1 | 5/2009 | Javora et al. |
| 2009/0197781 A1 | 8/2009 | Sunkara |
| 2010/0163228 A1 | 7/2010 | Abad et al. |
| 2014/0121136 A1* | 5/2014 | Mirakyan ............. C09K 8/52 507/201 |
| 2015/0021098 A1 | 1/2015 | Kippie |
| 2015/0191640 A1 | 7/2015 | Lee et al. |

FOREIGN PATENT DOCUMENTS

WO     2005095755 A1    10/2005

OTHER PUBLICATIONS

International Search Report and Written Opinion issued in International Application No. PCT/US2017/012578 dated Apr. 24, 2017 (16 pages).

* cited by examiner

*Primary Examiner* — Zakiya W Bates
(74) *Attorney, Agent, or Firm* — David J. Smith

(57) ABSTRACT

A method may include circulating a breaker fluid into a wellbore having a filtercake on the walls thereon, the filter cake including copolymer formed from at least one acrylamide monomer and at least one sulfonated anionic monomer, the breaker fluid comprising: a base fluid; and a mixture of hydrolysable esters of dicarboxylic acids.

19 Claims, 1 Drawing Sheet

BREAKER FLUIDS AND METHODS OF USE THEREOF

CROSS-REFERENCE TO RELATED APPLICATIONS

This application claims priority to U.S. patent application Ser. No. 62/276,080 filed on Jan. 7, 2016, which is incorporated herein by reference.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and lubricate the drill string and bit, and/or to maximize penetration rate.

One way of protecting the formation is by forming a filtercake on the surface of the subterranean formation. Filtercakes are formed when particles suspended in a wellbore fluid coat and plug the pores in the subterranean formation such that the filtercake prevents or reduce both the loss of fluids into the formation and the influx of fluids present in the formation. A number of ways of forming filtercakes are known in the art, including the use of bridging particles, cuttings created by the drilling process, polymeric additives, and precipitates. Fluid loss pills may also be used where a viscous pill comprising a polymer may be used to reduce the rate of loss of a wellbore fluid to the formation through its viscosity Upon completion of drilling, the filtercake and/or fluid loss pill may stabilize the wellbore during subsequent completion operations such as placement of a gravel pack in the wellbore. Additionally, during completion operations, when fluid loss is suspected, a fluid loss pill of polymers may be spotted into to reduce or prevent such fluid loss by injection of other completion fluids behind the fluid loss pill to a position within the wellbore which is immediately above a portion of the formation where fluid loss is suspected. Injection of fluids into the wellbore is then stopped, and fluid loss will then move the pill toward the fluid loss location.

After any completion operations have been accomplished, removal of filtercake (formed during drilling and/or completion) remaining on the sidewalk of the wellbore may be necessary. Although filtercake formation and use of fluid loss pills are essential to drilling and completion operations, the barriers can be a significant impediment to the production of hydrocarbon or other fluids from the well if, for example, the rock formation is still plugged by the barrier. Because the filtercake is compact, it often adheres strongly to the formation and may not be readily or completely flushed out of the formation by fluid action alone.

The problems of efficient well clean-up and completion are a significant issue in all wells, and especially in openhole horizontal well completions. The productivity of a well is somewhat dependent on effectively and efficiently removing the filtercake while minimizing the potential of water blocking, plugging, or otherwise damaging the natural flow channels of the formation, as well as those of the completion assembly.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of breaking a filtercake in a wellbore that includes circulating a breaker fluid into the wellbore having a filtercake on the walls thereon, the filter cake including copolymer formed from at least one acrylamide monomer and at least one sulfonated anionic monomer, the breaker fluid including a base fluid; and a mixture of hydrolysable esters of dicarboxylic acids.

In another aspect, embodiments disclosed herein relate to a method of performing a wellbore operation that includes pumping a wellbore fluid into a wellbore through an earthen formation, the wellbore fluid including a base fluid; and a polymeric fluid loss control agent formed from at least an acrylamide monomer and a sulfonated anionic monomer; operating a drilling tool in the wellbore during the pumping; circulating a breaker fluid into the wellbore having a filtercake on the walls thereon, the filter cake including the polymeric fluid loss control agent, the breaker fluid including a base fluid; and a mixture of hydrolysable esters of dicarboxylic acids.

Other aspects and advantages of the claimed subject matter will be apparent from the following description and the appended claims.

DETAILED DESCRIPTION

Figure 1:
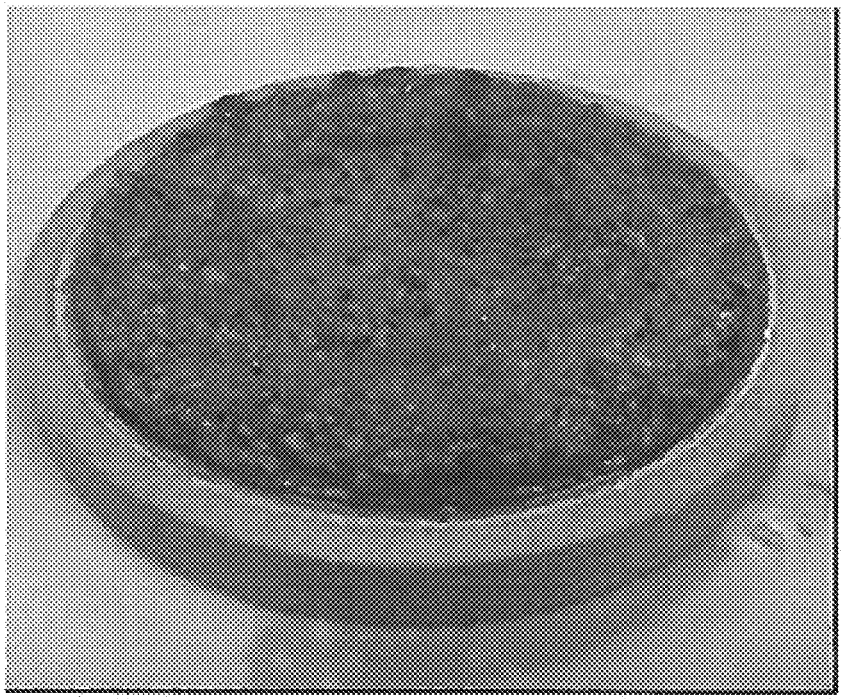
FIG. 1 is an image of a filtercake after soaking with a conventional breaker fluid for six days at 356° F.

In one aspect, embodiments disclosed herein are generally directed to chemical breaker and displacement fluids that are useful in the drilling, completing, and working over of subterranean wells, preferably oil and gas wells. In another aspect, embodiments disclosed herein are generally directed to the formulation of a breaker fluid that is able to break a filter cake that contains synthetic polymer components (e.g., copolymers of acrylamide and a sulfonated anionic monomer). Specifically, embodiments of breaker fluids may contain a mixture of hydrolysable esters of organic acids and optionally may include lactide and/or other components.

ae removal of water-based filtercake has been conventionally achieved with water based treatments that include: an aqueous solution with an oxidizer (such as persulfate), a hydrochloric acid solution, organic (acetic, formic) acid, combinations of acids and oxidizers, and aqueous solutions containing enzymes. Chelating agents (e.g., ethylenediaminetetraacetic acid (EDTA)) have also been used to promote the dissolution of calcium carbonate present in the filtercake. According to traditional teachings, the oxidizer and enzyme attack the polymer fraction of the filtercake and the acids and chelating agents typically attack the carbonate fraction (and other minerals) which may be used as bridging particles in the filtercake.

One of the most problematic issues facing filtercake removal involves the formulation of the clean-up or breaker fluid solutions that are both effective and stable, For example, one of the more common components in a filtercake is calcium carbonate, and a clean-up or breaker fluid solution would ideally include hydrochloric acid, which reacts very quickly with calcium carbonate bridging particles. However, while effective in targeting calcium carbonate bridging particles, such a strong acid is also reactive with any calcium carbonate in the formation (e.g., limestone), and it may be reactive or chemically incompatible with other desirable components of the clean-up solution. Additionally, filtercakes may be drilled with synthetic polymer components that can be difficult to degrade with common breaker fluid components (e.g., oxidants). Further the clean-up or breaker fluid solution can penetrate into the formation, resulting in unanticipated losses, and damage to the formation that subsequently result in only a partial clean-up or loss of well control.

Wellbore Fluids Containing Synthetic Polymers

Additives used in standard drilling fluids such as weighting solids and polymeric fluid loss materials may be resistant to degradation and conventional breaker fluids leaving residues that may hinder efficient hydrocarbon production, particularly when drilling fluid residues are present in producing intervals.

In order to overcome possible issues of formation damage associated with standard drilling fluids, a specialty fluid having a limited amount of solids and often degradable polymeric additives known as a reservoir drill-in fluid (RDF) may be used when drilling through the reservoir section of a wellbore. Particularly, RDFS may be formulated to minimize damage and maximize production of exposed zones. In some respects, an RDF may resemble a completion fluid. For example, drill-in fluids may be brines containing only selected solids of appropriate particle size ranges (often removable salts such as calcium carbonate) and fluid loss additives. Because completeness of removal and maximization of production of hydrocarbons can be significant weighting factors, it may be desirable in some embodiments to limit the inclusion of additives into the drill-in fluid to those associated with filtration control and removal of cuttings from the wellbore.

Wellbore fluids in accordance with the present disclosure may contain polymeric fluid loss control additives that withstand HTHP conditions, yet clean up with breaker fluids and be suitable for clean drilling and reservoir drill-in applications. During standard wellbore operation, wellbore fluids are often formulated with a number of polymeric additives to tune the viscosity and gel strength of the fluid such that wellbore fluids maintain the ability to suspend particulate additives and drill cuttings, particularly when circulation is stopped. Another function of the drilling fluid is its ability to seal permeable formations exposed by the bit with a low permeability filter cake. Seals are often by created by wellbore fluid additives such as polymers or bridging agents accumulating to form a filter cake on the walls of the wellbore.

However, rheological characteristics of wellbore fluids may be difficult to control because of the adverse conditions under which wellbore fluids are used, including high temperature, high shear (caused by the pumping and placement), high pressures, and low pH. For example, when drilling of certain deep wells, e.g., greater than 15,000 feet, or in geothermally active formations, temperatures may be such that the mal decomposition of certain drilling fluid additives occurs, which can cause detrimental changes in viscosity and flow characteristics that negatively affect the overall drilling operation.

Under HTHP conditions, polymeric materials used to viscosity wellbore fluids and provide a measure of fluid loss control may degrade, causing changes in the rheology of the fluid and may place additional strain on wellbore equipment. Exposure to HTHP conditions can have a detrimental effect on viscosifying agents, resulting in a loss in viscosity of the fluid at high temperatures. A breakdown of the rheology can limit or eliminate the ability of the wellbore fluid to suspend solids entrained within it (such as weighting agents, bridging agents or drill cuttings) and may lead to settlement, loss in fluid density, possible blowout of the well, or the like.

Specialized additives for HTHP conditions often contain polymeric materials that have exceptional resistance to extreme conditions, but can require specialized cleanup fluids to remove. For example, many cellulose and cellulose derivatives used as viscosifiers and fluid loss control agents degrade at temperatures around 200° F. and higher. Hydroxyethyl cellulose, on the other hand, is considered sufficiently stable to be used in an environment of no more than about 225° F. (107° C.). Likewise, because of the high temperature, high shear, high pressures, and low pH to which well fluids are exposed, xanthan gum is considered stable to be used in an environment of no more than about 290 to 300° F. (143 to 149° C.). However, the thermal stability of polymers such as xanthan gum may also contribute to decreased well productivity. As a result, expensive and often corrosive breaker fluids have been designed to disrupt filter cakes and residues left by these polymers, but beyond costs, the breakers may also result in incomplete removal and may be hazardous or ineffective under HTHP conditions.

In some embodiments, wellbore fluid additives in accordance with the present disclosure may also exhibit enhanced cleanup properties, and allow for use as brine viscosifiers and fluid loss additives in wellbore operations that may be sensitive to the amount of formation damage caused by standard drilling fluid additives. To this end, wellbore fluids and methods in accordance with the present disclosure may be used to treat fluid loss in some embodiments, for example, by formulating a drilling fluid or fluid loss pill with a crosslinked fluid loss control additive.

Wellbore fluids in accordance with the present disclosure that may be formulated as a RDF and may contain fluid loss control additives that aid in the removal of formation cuttings during drilling, yet may be removed using breaker fluids. Other applications for wellbore fluids formulated in accordance with the present disclosure include coiled tubing applications, completions, displacement, hydraulic fracturing, work-over, packer fluid emplacement or maintenance, well treating, or testing operations. In some embodiments, wellbore fluids in accordance with the present disclosure may be formulated as an RDF used in under-reaming in highly permeable and/or poorly consolidated formations when expanding a wellbore in a hydrocarbon-bearing formation to a wider diameter.

Fluid Loss Control Agent

Wellbore fluid formulations in accordance with the present disclosure may contain polymeric fluid loss control agents that may include a copolymer formed from at least one acrylamide monomer and at least one sulfonated anionic monomer. In one or more embodiments, the fluid loss control agent may a substantially linear copolymer and in other embodiments it may be a crosslinked and branched copolymer. In one or more embodiments, the fluid loss control agent may also include higher order copolymers and block copolymers such as terpolymers, quaternary polymers, and the like, including at least one acrylamide monomer, at least one sulfonated anionic monomer, and optionally other monomers as well.

In one aspect, wellbore fluids of the present disclosure incorporate a fluid loss control agent that is formed from at least an acrylamide monomer and a sulfonated anionic monomer. In one or more embodiments, fluid loss control agents may include polymers and copolymers synthesized from a mixture of monomers that may include acrylamide-based monomers. Acrylamide-based monomers in accordance with the present disclosure may play a role in creating an effective and high temperature stable fluid loss control agents, enhancing the fluid's high temperature endurance. In addition to unsubstituted acrylamide monomers, acrylamide-based monomers may also include N-substituted acrylamides, such as alkylacrylamides, N-methylol, N-isopropyl, diacetone-acrylamide, N-alkyl acrylamide (where alkyl is $C_1$ to $C_{14}$), N,N-dialkyl acrylamides (where alkyl is $C_1$ to $C_{14}$), N-cycloalkane acrylamides, combinations of the above and related compounds.

The fluid loss control agents may also contain one or more sulfonated anionic monomers. While not limited to a particular theory, incorporation of anionic monomers may increase stability when added to a copolymer by repelling negatively charged hydroxide ions that promote hydrolysis of the acrylamide moiety of the polymer. Sulfonated anionic monomers, such as 2-acrylamide-2-methyl-propanesulfonic acid (AMPS®), a trademark of the Lubrizol Corporation—also referred to as acrylamide tertiary butyl sulfonic acid (ATBS), vinyl sulfonate, styrene sulfonic acid, and the like, may provide tolerance to divalent cations such as calcium and magnesium encountered in drilling fluids. Thus, the incorporation of sulfonated anionic monomers may result in an improved thermally stable fluid loss control agent for divalent cation systems, including brine based drilling fluids. Depending upon the reactivity ratio and the end use of the polymer, other sulfonated monomers may also be utilized for preparing an effective fluid loss control agent.

Further, it is also within the scope of the present disclosure that other monomers can be incorporated into the polymer composition depending upon the end use of the polymer or the type of aqueous base drilling fluid. For example, lipophilic monomers, such as isobornyl methacrylate, 2-ethyl hexyl acrylate, N-alkyl and N,N-dialkyl acrylamide, styrene and the like can be incorporated to improve the performance of the polymer in high brine containing drilling fluids. Also, to make it more tolerant to other electrolytes, anionic monomers, such as maleic acid, tetrahydrophthalic acid, fumaric acid, acrylic acid and the like can be incorporated into the polymers.

In one or more embodiments, fluid loss control agents may contain covalent intermolecular crosslinking depending on the desired functional characteristics of the polymer. In one or more embodiments, the extent of crosslinking may be selected to maximize the viscosity of the resulting polymer in solution. In one or more embodiments, a crosslinked fluid loss control agent may exhibit a bell-curve type response for its viscosity in solution as the quantity of crosslinker used to crosslink the co-polymer is increased. That is, the viscosity initially increases as the quantity of crosslinker (and thus the crosslinks) are increased until a peak viscosity is reached, at which point the viscosity decreases and eventually results in a substantially zero slope as the quantity of crosslinker is further increased. In one or more embodiments, the crosslinked fluid loss control agent used in the RDF may be synthesized with an amount of crosslinker, and thus extent of crosslinking, so that its viscosity response is in the higher viscosity region of the bell-curve described above. For example, in one or more embodiments, the extent of crosslinking in the crosslinked fluid loss control agent may be selected so that the viscosity of fluid loss control agent is within a peak viscosity response of the viscosity response curve (created by plotting viscosity as a function of crosslinker under otherwise constant conditions). In one or more embodiments, the peak viscosity response may be defined as the amount of crosslinker that correlates to the peak amount plus or minus the amount of crosslinker that correlates to up to 75% of the area under the viscosity response curve that terminates upon reaching substantially zero slope. In more particular embodiments, the amount of crosslinker may be that which correlates to within 50%, or in some embodiments 25%, of the area under the viscosity response curve.

In one or more embodiments, the peak viscosity response may be expressed as the the amount of crosslinker that correlates to the peak amount plus or minus the amount of crosslinker that correlates to 1.5 standard deviations from the peak amount. In more particular embodiments, the amount of crosslinker correlates to the peak amount plus or minus the amount of crosslinker that correlates to 1.0 standard deviations from the peak amount or from 0.5 standard deviations in even more particular embodiments. Further, in one or more embodiments, the peak viscosity response may be expressed as the amount of crosslinker that correlates to the peak amount plus or minus 50% of the peak amount. In more particular embodiments, the amount of crosslinker is the peak amount plus or minus 30% or 20% of the peak amount. Further, based on the above, one of ordinary skill in the art would appreciate that the breadth of the amount of crosslinker (and selection of amount of crosslinker) may depend, for example, on the shape of the viscosity response curve and the desired rheological properties for the wellbore fluid and its particular application.

Crosslinking may be achieved, for example, by incorporation of crosslinking monomers such as methylenebisacrylamide, divinyl benzene, allylmethacrylate, tetra allyloxethane or other allylic bifunctional monomers. The crosslinked fluid loss control agent may have a percentage of intermolecular crosslinking that ranges from 0.25% to 10% in some embodiments, from 0.5% to 5% in other embodiments, and from 0.75% to 2.5% in other embodiments.

Wellbore fluids of the present disclosure may also exhibit temperature stability up to 250° F. (121° C.) in some embodiments, or greater that 250° F. (121° C.) in other embodiments. For example, in one or more embodiments, wellbore fluids of the present disclosure may exhibit temperature stability up to 300° F., or up to 350° F., or up to 400° F., or up to 450° F. Temperature stability may be described herein as the ability of the fluid to maintain suitable rheology at the temperature indicated above for at least five days. In one or more embodiments, a wellbore fluid of the present disclosure may exhibit low end rheology (i.e., rheology at 3 and 6 rpm) that does not deviate by more than 30 percent under the elevated temperature conditions indicated above when compared to the low end rheology at temperatures below about 250° F. In one or more embodiments, the rheology at 3 rpm, when tested at 120° F., for fluids according to the present disclosure may be at least 5 under any of the temperature conditions described above.

In one or more embodiments, fluid loss control additives may be added to a wellbore fluid at a concentration that that ranges from a lower limit selected from the group of 0,5, 1, 2,5, and 3 lb/bbl, to an upper limit selected from the group of 5, 10, 12, and 15 lb/bbl, where the concentration may range from any lower limit to any upper limit. The amount needed will vary, of course, depending upon the type of wellbore fluid, contamination, and temperature conditions.

In one or more embodiments, the polymeric fluid loss control agent may have an average molecular weight that ranges from a lower limit selected from the group of 250, 500, and 1,000 Da, to an upper limit selected from the group of 100, 250, 500, and 1,000 kDa, where the molecular weight may range from any lower limit to any upper limit. As used herein, molecular weight refers to weight average molecular weight ($M_w$) unless indicated otherwise.

In one or more embodiments, fluid loss control agents may be a copolymer having a ratio of acrylamide monomer and sulfonated anionic monomer that ranges from 0.5:1 to 10:1. In some embodiments, a ratio of acrylamide monomer and sulfonated anionic monomer may range from 1:1 to 5:1

Base Fluids for the Wellbore Fluid

In one or more embodiments, fluid loss control additives in accordance with the present disclosure may be hydrated by their simple addition to a base fluid. For example, the fluid loss control additives may be hydrated by free water upon their addition to water or a brine used a base fluid. In one or more embodiments, the fluid of the present disclosure may have an aqueous base fluid, the fluid being a monophasic fluid, in which the above mentioned polymers are included. The aqueous medium of the present disclosure may be water or brine. In those embodiments of the disclosure where the aqueous medium is a brine, the brine is water comprising an inorganic salt or organic salt, The salt may serve to provide desired density to balance downhole formation pressures, and may also reduce the effect of the water based fluid on hydratable clays and shales encountered during drilling. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, zinc, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts.

In some embodiments, the fluid may be a divalent halide is selected from the group of alkaline earth halides or zinc halides. The brine may also comprise an organic salt, such as sodium, potassium, or cesium formate. Inorganic divalent salts include calcium halides, such as calcium chloride or calcium bromide. Sodium bromide, potassium bromide, or cesium bromide or other monovalent halides may also be used. The salt may be chosen for compatibility reasons, i.e. where the reservoir drilling fluid used a particular brine phase and the completion/clean up fluid brine phase is chosen to have the same brine phase.

Additives

In one embodiment, the drilling fluid of the disclosure may further contain other additives and chemicals that are known to be commonly used in oilfield applications by those skilled in the art. A variety of additives can be included in the aqueous based drilling fluid of this disclosure with the purpose of formation of a thin, low permeability filter cake which seals pores and other openings in the formations which are penetrated by the bit. Such additives may include thinners, weighting material, gelling agents, shale inhibitors, pH buffers, etc.

Wellbore fluids of the present disclosure may contain other materials needed to form complete drilling fluids. Such other materials optionally may include, for example: additives to reduce or control low temperature theology or to provide thinning, additives for enhancing viscosity, additives for high temperature high pressure control, and emulsion stability.

Examples of wellbore fluid thinners that may be used include lignosulfonates, lignitic materials, modified lignosulfonates, polyphosphates and tannins. In other embodiments low molecular weight polyacrylates can also be added as thinners. Thinners are added to a drilling fluid in order to reduce flow resistance and gel development. Other functions performed by thinners include the reduction of filtration and cake thickness, to counteract the effects of salts, to minimize the effects of water on the formations drilled, to emulsify oil in water, and to stabilize mud properties at elevated temperatures.

The HTHP wellbore fluids of the present disclosure additionally include an optional weighting material, sometimes referred to as a weighting agent. The type and quantity of weighting material used may depend upon the desired density of the final drilling fluid composition. Weight materials include, but are not limited to: barite, iron oxide, calcium carbonate, magnesium carbonate, and combinations of such materials and derivatives of such materials. The weight material may be added in a quantity to result in a drilling fluid density of up to 24 pounds per gallon. In an embodiment, the particulate weighting agent may be composed of an acid soluble material such as calcium carbonate, magnesium carbonate, $Mn_3O_4$, etc.

The solid weighting agents may be of any particle size (and particle size distribution), but some embodiments may include weighting agents having a smaller particle size range than API grade weighing agents, which may generally be referred to as micronized weighting agents. Such weighting agents may generally be in the micron (or smaller) range, including submicron particles in the nanosized range. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In one or more embodiments, an amine stabilizer may be used as a pH buffer and/or thermal extender to prevent acid-catalyzed degradation of polymers present in the fluid. A suitable amine stabilizer may include triethanolamine; however, one skilled in the art would appreciate that other amine stabilizers such as methyldiethanol amine (MDEA), dimethylethanol amine (DMSA), diethanol amine (DEA), monoethanol amine (MEA), cyclic organic amines, sterically hindered amines, amides of fatty acid, or other suitable tertiary, secondary, and primary amines and ammonia could be used in the fluids of the present disclosure.

In some embodiments, the amine stabilizer may be commercially available amine stabilizers such as PTS-200, or polyether amines polyether amines such as the JEFFAMINE series of polyether amines including Jeffamine D-230, all of which are available from M-I L.L.C. (Houston, Tex.). Amine stabilizers may be added to a wellbore fluid in accordance with the present disclosure at a concentration that ranges from 0.1% to 10% by weight of the wellbore fluid in some embodiments, and from 0.5% to 5% by weight of the wellbore fluid in other embodiments. Further, is also envisioned that the fluid may be buffered to a desirable pH using, for example, magnesium oxide. The compound serves as to buffer the pH of the drilling fluid and thus maintain the alkaline conditions under which the process of hydrolysis or degradation of the polymers is retarded.

The fluids may be formulated or mixed according to various procedures; however, in particular embodiments, the polymeric fluid loss control agent of the present disclosure may be yielded in fresh water prior to be added to a brine (or vice versa). Thus, after the polymer yields in fresh water, a brine (such as a divalent halide) may be combined with the yielded polymer. The gelling agent may be added to the yielded polymer either before, after, or simultaneous with the brine.

Upon mixing, the fluids of the present embodiments may be used in drilling operations. Drilling techniques are known to persons skilled in the art and involve pumping a drilling fluid into a wellbore through an earthen formation. The fluids of the present embodiments have particular application for use in high temperature environments. The drilling fluid formulations disclosed herein may possess high thermal stability, having particular application for use in environments of up to 450° F. In yet another embodiment, the fluids of the present disclosure are thermally stable for at least 16 hours, or for at least two days, or for at least five days at the elevated temperatures indicated above.

One embodiment of the present disclosure involves a method of drilling a wellbore. In one such illustrative embodiment, the method involves pumping a drilling fluid into a wellbore during the drilling through a reservoir section of the wellbore, and then allowing filtration of the drilling fluid into the earthen formation to form a filter cake on the wellbore walls. The filter cake is partially removed afterwards, thus allowing initiation of the production of hydrocarbons from reservoir. The formation of such a filter cake is desired for drilling, particularly in unconsolidated formations with wellbore stability problems and high permeabilities. Further, in particular embodiments, the fluids of the present disclosure may be used to drill the reservoir section of the well, and the open hole well may be subsequently completed (such as with placement of a screen, gravel packing, etc.) with the filter cake remaining in place. After the completion equipment is installed, removal of the filter cake may be achieved through use of a breaker fluid (or internal breaking agent).

In one or more embodiments, the fluids of the present disclosure may also find utility in coiled tubing applications where the high temperature stability of the fluid could be useful. Coiled tubing applications use a long metal pipe that can be spooled on large reels in a variety of downhole operations including well interventions, production operations, and in some instances drilling. Many of the operations that use coiled tubing may also be done by wireline. However, coiled tubing has the advantage of being able to be pushed into the wellbore rather than the reliance on gravity with wireline and also fluids may be pumped through the coiled tubing. In embodiments where the fluids of the present disclosure are used in coiled tubing applications a lubricant may be added to the wellbore fluids to reduce friction although, the crosslinked fluid-loss control additive may effectively act as a friction reducer when used in coiled tubing applications.

Breaker Fluids

After completion of the drilling or completion process, filter cakes deposited by drilling and treatment fluids may be broken by application of a breaker fluid that degrades the constituents of the filter cake. The breaker fluid may be circulated in the wellbore during or after the performance of the at least one completion operation. In other embodiments, the breaker fluid may be circulated either before, during, or after a completion operation has commenced to destroy the integrity of and clean up residual drilling fluids remaining inside casing or liners. The breaker fluid may contribute to the degradation and removal of the filter cake deposited on the sidewalls of the wellbore to minimize the possibility of negatively impacting production. Upon cleanup of the well, the well may then be converted to production.

The breaker fluids of the present disclosure may also be formulated to contain an acid to decrease the pH of the breaker fluid and aid in the degradation of filter cakes within the wellbore. Examples of acids that may be used as breaker fluid additives include strong mineral acids, such as hydrochloric acid or sulfuric acid, and organic acids, such as citric acid, salicylic acid, lactic acid, malic acid, acetic acid, and formic acid. Suitable organic acids that may be used as the acid may include citric acid, salicylic acid, glycolic acid, malic acid, maleic acid, fumaric acid, and homo- or copolymers of lactic acid and glycolic acid as well as compounds containing hydroxy, phenoxy, carboxylic, hydroxycarboxylic or phenoxycarboxylic moieties. In one or more embodiments, before, during, or after a completion operation has started or upon conclusion of all completion operations, the circulation of an acid wash may be used to at least partially dissolve some of the filter cake remaining on the wellbore walls.

In one or more embodiments, breaker fluids may include hydrolysable esters of organic acids. Generally, hydrolysable esters that may hydrolyze to release an organic (or inorganic) acid may be used, including, for example, hydrolyzable esters of a $C_1$ to $C_6$ carboxylic acid (including hydroxyl or alkoxy carboxylic acids and/or di- or polycarboxylic acids) and/or a $C_1$ to $C_{30}$ mono- or poly-alcohol. In one or more embodiments, one or more hydrolysable esters of a dicarboxylic acid, such as a $C_3$ to $C_8$ dicarboxylic acid, may be used in the breaker fluid. Thus, it is also envisioned that mixtures of hydrolyzable esters of dicarboxylic acids may be used. In one or more embodiments, the mixtures of hydrolysable esters of dicarboxylic acids may contain $C_3$ to $C_8$ dicarboxylic acids. In one or more embodiments, the mixture of hydrolyzable esters of dicarboxylic acids may include about 57-67 wt. % dimethyl glutarate, 18-28 wt. % dimethyl succinate, and 8-22 wt. % dimethyl adipate.

In one or more embodiments, lactide, a cyclic diester of lactic acid, may be added to the breaker fluid as a hydrolysable ester. In one or more embodiments, lactide may be used in combination with a mixture of dicarboxylic acid esters in a breaker fluid. In one or more embodiments, the mixture of dicarboxylic acid esters and lactide may contain from 10-99 wt. % dicarboxylic acid esters and from 1 to 90 wt. % lactide. In particular embodiments, a mixture of hydrolysable esters may be used in the breaker fluid where the mixture includes about 50 wt. % lactide, about 27-34 wt. % dimethyl glutarate, about 9-14 wt. % dimethyl succinate, and 4-11 wt. % dimethyl adipate. In addition to these hydrolysable carboxylic esters, hydrolysable phosphonic or sulfonic esters could be utilized, such as, for example, $R^1H_2PO_3$, $R^1R^2HPO_3$, $R^1R^2R^3PO_3$, $R^1HSO_3$, $R^1R^2SO_3$, $R^1H_2PO_4$, $R^1R^2HOP_4$, $R^1R^2R^3PO_4$, or $R^1R^2SO_4$, where $R^1$, $R^2$, and $R^3$ are $C_2$ to $C_{30}$ alkyl-, aryl-, arylalkyl-, or alkylaryl-groups.

However, the present inventors have found that the solubility of the dicarboxylic acid esters and/or lactide may depend upon the conditions including type of brine being used as the base fluid for the breaker fluid. That is, the maximum solubility of each component may vary among, for example, divalent and monovalent brines. In some embodiments, a glycol ether such as those formed from C1-C6 alcohols and C2-12 glycols including, but not limited to, dipropylene glycol methyl ether, hexylene glycol methyl ether, ethylene glycol monobutyl ether (EGMBE), and triethylene glycol monobutyl ether (TEGMBE) may be added to the breaker fluid as a solubility modifier. It is also envisioned that a polar organic solvent component, which may be a mono-hydric, di-hydric or poly-hydric alcohol or a mono-hydric, di-hydric, or poly hydric alcohol having poly-functional groups, may be used as a solubility modifier. Examples of such compounds include aliphatic diols (i.e., glycols, 1,3-diols, 1,4-diols, etc.), aliphatic poly-ols (i.e., tri-ols, tetra-ols, etc.), poly glycols (i.e., polyethylenepropylene glycols, polypropylene glycol, polyethylene glycol, etc.). When included, the solubility modifier may be about 50 to 90 wt. % of the total weight of esters and solubility modifier in the breaker fluid. For example, a breaker fluid may include a component that is a combination of 10 to 50 wt. % lactide and 50-90 wt. % solubility modifier or a component that is a combination of 10 to 30 wt. % dicarboxylic acid esters, 10 to 50 wt. % lactide, and 20 to 80 wt. % solubility modifier. Esters, whether used alone or in combination with a solubility modifier, may be added to a breaker fluid in an amount that ranges from 5 to 50 vol % of the breaker fluid or from 10 to 40 vol % in more particular embodiments. It is understood that when a solubility modifier is used, the combined ester and solubility modifier may be added to the breaker fluid in the amount that ranges from 5 to 50 vol % of the breaker fluid.

In some instances, it may also be desirable to include an oxidant in the breaker fluid, to further aid in breaking or degradation of polymeric additives present in a filter cake. The oxidants may be used with a coating to delay their release or they may be used without a coating. Examples of such oxidants may include any one of those oxidative breakers known in the art to react with polymers such as polysaccharides to reduce the viscosity of polysaccharide-thickened compositions or disrupt filter cakes. Such compounds may include bromates, peroxides (including peroxide adducts), other compounds including a peroxy bond such as persulfates, perborates, percarbonates, perphosphates, and persilicates, and other oxidizers such as hypochlorite& In one or more embodiments, the oxidant may be included in the breaker fluid in an amount from about 1 ppb to 10 ppb. Further, use of an oxidant in a breaker fluid, in addition to affecting polymeric additives, may also cause fragmentation of swollen clays, such as those that cause bit balling.

In one or more embodiments, the breaker fluids of the present disclosure may also be formulated to contain an acid to decrease the pH of the breaker fluid and aid in the degradation of filter cakes within the wellbore. Examples of acids that may be used as breaker fluid additives include strong mineral acids, such as hydrochloric acid or sulfuric acid, and organic acids, such as citric acid, salicylic acid, lactic acid, malic acid, acetic acid, and formic acid. Suitable organic acids that may be used as the acid sources may include citric acid, salicylic acid, glycolic acid, malic acid, maleic acid, fumaric acid, and homo- or copolymers of lactic acid and glycolic acid as well as compounds containing hydroxy, phenoxy, carboxylic, hydroxycarboxylic or phenoxycarboxylic moieties. When included, the acid may be from about 5% to 20% by volume of the breaker fluid.

In one or more embodiments, the breaker fluid may contain chelants to help dissolve precipitates or other solids present in the filtercake. Chelating agents suitable for use in the breaker fluids of the present disclosure may include polydentate chelating agents such as ethylenediaminetetraacetic acid (EDTA), diethylenetriaminepentaacetic acid (DTPA), nitrilotriacetic acid (NTA), ethylene glycol-bis(2-aminoethyl)-N,N,N',N'-tetraacetic acid (EGTA) 1,2-bis(o-aminophenoxy)ethane-N,N,N',N'-tetraaceticacid (BAPTA), cyclohexanediaminete-traacetic acid (CDTA), triethylenetetraaminehexaacetic acid (TTHA), N-(2-Hydroxyethyl) ethylenediamine-N,N',N'-triacetic acid (HEDTA), glutamic-N,N-diatetic acid (GLDA), ethylene-diamine tetramethylene sulfonic acid (EDTMS), diethylene-triamine penta-methylene sulfonic acid (DETPMS), amino tri-methylene sulfonic acid (ATMS), ethylene-diamine tetra-methylene phosphonic acid (EDTMP), diethylene-triamine penta-methylene phosphonic acid (DETMP), amino tri-methylene phosphonic acid (ATMP), and mixtures thereof. Such chelating agents may include potassium or sodium salts thereof in some embodiments. Particular examples of chelants that may be employed in certain embodiments include ethylenediaminetetraacetic acid (EDTA), glutamic acid diacetic acid (GLDA) (such as L-glutamic acid, N,N-diacetic acid) iminodiacetic acids and/or salts thereof. A commercially available example of chelants that may be used in breaker fluid formulations is D-SOLVER EXTRA, available from MI-LLC (Houston, Tex). When included, chelants may be from about 5-20% by volume of the breaker fluid.

In general, the base fluid of a breaker fluid may be may be an aqueous medium selected from water or brine. In those embodiments of the disclosure where the aqueous medium is a brine, the brine is water comprising an inorganic salt or organic salt. The salt may serve to provide desired density to balance downhole formation pressures. In various embodiments of the breaker fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, zinc, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts.

In some embodiments, the base fluid for the breaker may be a brine that includes a divalent halide that is selected from the group of alkaline earth halides or zinc halides. The brine may also comprise an organic salt, such as sodium, potassium, or cesium formate. Inorganic divalent salts include calcium halides, such as calcium chloride or calcium bromide. Sodium bromide, potassium bromide, or cesium bromide may also be used. The salt may be chosen for compatibility reasons, i.e. where the reservoir drilling fluid used a particular brine phase and the breaker fluid brine phase is chosen to have the same brine phase.

It should be appreciated that the amount of delay between the time when a breaker fluid according to the present disclosure is introduced to a well and the time when the fluids have had the desired effect of breaking/degrading/dispersing the filter cake may depend on several variables. One of skill the art should appreciate that factors such as the downhole temperature, concentration of the components in the breaker fluid, pH, amount of available water, filter cake composition, etc. may all have an impact. For example downhole temperatures can vary considerably from 100° F. to over 400° F. depending upon the formation geology and downhole environment. However, one of skill in the art via trial and error testing in the lab should easily be able to determine and thus correlate downhole temperature and the time of efficacy of for a given formulation of the breaker fluids disclosed herein. With such information one can predetermine the time period necessary to shut-in a well given a specific downhole temperature and a specific formulation of the breaker fluid.

Breaker fluids in embodiments of this disclosure be emplaced in the wellbore using conventional techniques known in the art, and may be used in drilling, completion, workover operations, etc. Additionally, one skilled in the art would recognize that such wellbore fluids may be prepared with a large variety of formulations. Specific formulations may depend on the stage in which the fluid is being used, for example, depending on the depth and/or the composition of the formation. Moreover, one skilled in the art would also appreciate that other additives known in the art may be added to the breaker fluids of the present disclosure without departing from the scope of the present disclosure.

The types of filtercakes that the present breaker fluids may break include those formed from oil-based or water-based drilling fluids, but particularly water-based drilling fluids including reservoir drill-in fluids. That is, the filtercake may be either an oil-based filter cake (such as an invert emulsion filter cake produced from a fluid in which oil is the external or continuous phase) or a water-based (such as an aqueous filtercake in which water or another aqueous fluid is the continuous phase). It is also within the scope of the present disclosure that filtercakes may also be produced with direct emulsions (oil-in-water), or other fluid types. Additionally, the present breaker fluids may be particularly useful for breaking filtercakes that contain synthetic polymers, including crosslinked and branched synthetic polymers that are often not able to be broken by conventional breaker fluid formulations. However, the breakers may also be effective in breaking fluids/filtercakes formed with conventional polymers used in water-based fluids, such as xanthan and starches.

As described above, the breaker fluid may be circulated in the wellbore during or after the performance of at least one completion operation. In other embodiments, the breaker fluid may be circulated either after a completion operation or after production of formation fluids has commenced to destroy the integrity of and clean up residual drilling fluids remaining inside casing or liners.

Generally, a well is often "completed" to allow for the flow of hydrocarbons out of the formation and up to the surface. As used herein, completion processes may include one or more of the strengthening the well hole with casing, evaluating the pressure and temperature of the formation, and installing the proper completion equipment to ensure an efficient flow of hydrocarbons out of the well or in the case of an injector well, to allow for the injection of gas or water. Completion operations, as used herein, may specifically include open hole completions, conventional perforated completions, sand exclusion completions, permanent completions, multiple zone completions, and drainhole completions, as known in the art. A completed wellbore may contain at least one of a slotted liner, a predrilled liner, a wire wrapped screen, an expandable screen, a sand screen filter, an open hole gravel pack, or casing, for example.

Breaker fluids as disclosed herein may also be used in a cased hole to remove any drilling fluid left in the hole during any drilling and/or displacement processes. Well casing may consist of a series of metal tubes installed in the freshly drilled hole. Casing serves to strengthen the sides of the well hole, ensure that no oil or natural gas seeps out of the well hole as it is brought to the surface, and to keep other fluids or gases from seeping into the formation through the well. Thus, during displacement operations, typically, when switching from drilling with an oil-based mud to a water-based mud (or vice-versa), the fluid in the wellbore is displaced with a different fluid. For example, an oil-based mud may be displaced by another oil-based displacement fluid to clean the wellbore The oil-based displacement fluid may be followed with a water-based displacement fluid prior to beginning drilling or production. Conversely, when drilling with a water-based mud, prior to production, the water-based mud may be displaced with a water-based displacement fluid, followed with an oil-based displacement fluid. Further, one skilled in the art would appreciate that additional displacement fluids or pills, such as viscous pills, may be used in such displacement or cleaning operations as well, as known in the art.

Another embodiment of the present disclosure involves a method of cleaning up a wellbore drilled with an oil based drilling fluid. In one such illustrative embodiment, the method involves circulating a breaker fluid disclosed herein in a wellbore, and then shutting in the well for a predetermined amount of time to allow penetration and fragmentation of the filtercake to take place. Upon fragmentation of the filtercake, the residual drilling fluid may be easily washed out of the wellbore. Alternatively, a wash fluid (different from the breaker fluid) may be circulated through the wellbore prior to commencing production.

Yet another embodiment of the present invention involves a method of cleaning up a well bore drilled with a water-based drilling fluid, described above. In one such illustrative embodiment, the method involves circulating a breaker fluid disclosed herein in a wellbore and then shutting in the well for a predetermined amount of time to allow penetration and fragmentation of the filter cake to take place. Upon fragmentation of the filter cake, the fluid (and residual filter cake dispersed therein) can be easily produced from the well bore upon initiation of production and thus the residual drilling fluid is easily washed out of the well bore. Alternatively, a wash fluid (different from the breaker fluid) may be circulated through the wellbore prior to commencing production.

The fluids disclosed herein may also be used in a wellbore where a screen is to be put in place downhole. After a hole is under-reamed to widen the diameter of the hole, the drilling string may be removed and replaced with production tubing having a desired sand screen, in one or more embodiments, an expandable tubular sand screen may be expanded in place or a gravel pack may be placed in the well. Breaker fluids may then be placed in the well, and the well is then shut in to allow penetration and fragmentation of the filtercake to take place. Upon fragmentation of the flltercake, the fluids can be easily produced from the well bore upon initiation of production and thus the residual drilling fluid is easily washed out of the well bore. In one or more embodiments, a wash fluid (different from the breaker fluid) may be circulated through the wellbore prior to commencing production.

However, the breaker fluids disclosed herein may also be used in various embodiments as a displacement fluid and/or a wash fluid. As used herein, a displacement fluid is typically used to physically push another fluid out of the wellbore, and a wash fluid typically contains a surfactant and may be used to physically and chemically remove drilling fluid residue from downhole tubulars. When also used as a displacement fluid, the breaker fluids of the present disclosure may act to effectively push or displace the drilling fluid. When also used as a wash fluid, the breaker fluids may assist in physically and/or chemically removing the filter cake once the filter cake has been disaggregated by the breaker system.

Further, in some embodiments, the breaker fluids of the present disclosure may be used in wells that have been gravel packed. For example, as known to those skilled in the art, gravel packing involves pumping into the well (and placing in a production interval) a carrier fluid (conventionally a viscoelastic fluid) that contains the necessary amount of gravel to prevent sand from flowing into the wellbore during production. However, filter cake remaining on the walls and the viscoelastic carrier fluid should be removed prior to production. In a particular embodiment, after placement of a gravel pack, a breaker fluid of the present disclosure may be emplaced in the production interval and allowed sufficient time to decrease the viscosity of the viscoelastic carrier fluid and then penetrate and fragment filter cake in the interval, as described above. Alternatively, a wash fluid may be used following the placement of the gravel pack, but prior to the emplacement of the breaker fluid.

EXAMPLES

Two breaker fluids were tested for their ability to break a filtercake One of the breaker fluids was a conventional breaker having 15 vol. % acetic acid, 10 vol. % D-SOLVER EXTRA, a chelant solution available from MI-LLC (Houston, Tex.), and the remainder being a 20.2 ppb $ZnBr_2$ brine. The other breaker fluid was a breaker having 15 vol. % acetic acid, 10 vol. % D-SOLVER EXTRA, and 20 vol. % of ECF-1872, which is a mixture of dicarboxylic acid esters, available from M-I LLC (Houston, Tex.), with the remainder being a 20.2 ppb $ZnBr_2$ brine.

Figure 2:
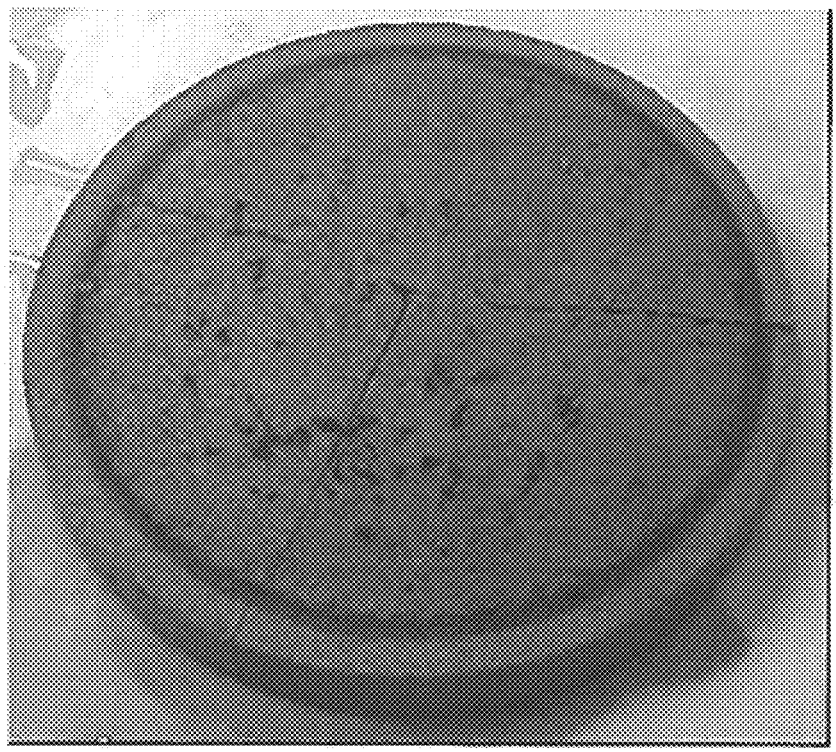
FIG. 2 is an image of a filtercake after soaking with breaker fluid according to the present disclosure for six days at 356° F.

FIG. 1 shows the results of soaking a filtercake with the conventional breaker fluid for six days at 356° F., while FIG. 2 shows the results of soaking a similar filtercake in the breaker fluid according to the present disclosure in the same conditions. As seen in the figures, the breaker fluid according to the present disclosure effectively removed the filtercake, while a significant amount of material remained after the soak with the conventional breaker fluid.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of breaking a filtercake in a wellbore, comprising:
    circulating a breaker fluid into the wellbore having a filtercake on the walls thereon, the filtercake including copolymer formed from at least one acrylamide monomer and at least one sulfonated anionic monomer, the breaker fluid comprising:
        a base fluid; and
        a mixture of hydrolysable esters of dicarboxylic acids comprising about 27-67 wt. % dimethyl glutarate, about 9-28 wt. % dimethyl succinate, and about 4-22 wt. % dimethyl adipate.
2. The method of claim 1, wherein the acrylamide monomer is at least one selected from unsubstituted acrylamide, alkylacrylamides, N-methylol acrylamide, N-isopropyl acrylamide, diacetone-acrylamide, N-alkyl acrylamide, where alkyl is $C_1$ to $C_{14}$, NN-dialkyl acrylamides, where alkyl is $C_1$ to $C_{14}$, N-cycloalkane acrylamides.
3. The method of claim 1, wherein the sulfonated anionic monomer is selected from 2-acrylamide-2-methyl-propane-sulfonic acid, vinyl sulfonate, and styrene sulfonic acid.
4. The method of claim 1, wherein the copolymer is branched and contains covalent intermolecular crosslinking.
5. The method of claim 1, further comprising a solubility modifier selected from polyols, glycols, glycol ethers, or polyglycols.
6. The method of claim 1, wherein the mixture further comprising at least one chelant.
7. The method of claim 6, wherein the mixture comprises about 27-34 wt. % dimethyl glutarate, about 9-14 wt. % dimethyl succinate, and about 4-11 wt. % dimethyl adipate and further wherein the at least one chelant is present at about 5-20% by volume of the breaker fluid.
8. A method of performing a wellbore operation, comprising:
    pumping a wellbore fluid into a wellbore through an earthen formation, the wellbore fluid comprising:
        a base fluid; and
        a crosslinked polymeric fluid loss control agent formed from at least an acrylamide monomer and a sulfonated anionic monomer having a percentage of crosslinking from 0.25% to 10%;
    operating a drilling tool in the wellbore during the pumping;
    circulating a breaker fluid into the wellbore having a filtercake on the walls thereon, the filtercake including the polymeric fluid loss control agent, the breaker fluid comprising:
        a base fluid; and
        a mixture of hydrolysable esters of dicarboxylic acids.
9. The method of claim 8, wherein the wellbore fluid is pumped into the wellbore during the drilling through a reservoir section of the wellbore.
10. The method of claim 9, further comprising:
    initiating production of hydrocarbons from the reservoir.
11. The method of claim 8, wherein the acrylamide monomer is at least one selected from unsubstituted acrylamide, alkylacrylamides, N-methylol acrylamide, N-isopropyl acrylamide, diacetone-acrylamide, N-alkyl acrylamide, where alkyl is $C_1$ to $C_{14}$, N,N-dialkyl acrylamides, where alkyl is $C_1$ to $C_{14}$, N-cycloalkane acrylamides.
12. The method of claim 8, wherein the sulfonated anionic monomer is selected from 2-acrylamide-2-methyl-propane-sulfonic acid, vinyl sulfonate, and styrene sulfonic acid.
13. The method of claim 8, wherein the crosslinking of the fluid loss control agent is covalent intermolecular crosslinking, and further wherein the fluid loss control agent is a branched copolymer.
14. The method of claim 13, wherein the fluid loss control agent has an extent of crosslinking that is selected so that the fluid loss control agent has a viscosity that is within a peak viscosity response of the viscosity response curve.
15. The method of claim 14, wherein the peak viscosity response is defined as having an amount of crosslinker that correlates to the peak viscosity amount plus or minus the amount of crosslinker that correlates to up to 75% of the area under the viscosity response curve.
16. The method of claim 8, wherein the wellbore fluid exhibits low end rheology that does not deviate by more than 30 percent under a temperature up to 300° F. when compared to low end rheology of the fluid at temperatures below about 250° F.

17. The method of claim 8, wherein after aging the wellbore fluid for at least 5 days at a temperature of at least 300° F., the rheology of the wellbore fluid at 3 rpm, when tested at 120° F., is at least 5.

18. The method of claim 8, further comprising a solubility modifier selected from polyols, glycols, glycol ethers, or polyglycols.

19. The method of claim 8, wherein the breaker fluid further comprises formic acid or acetic acid.

* * * * *

UNITED STATES PATENT AND TRADEMARK OFFICE
CERTIFICATE OF CORRECTION

PATENT NO. : 10,214,677 B2
APPLICATION NO. : 15/400354
DATED : February 26, 2019
INVENTOR(S) : Panamarathupalayam et al.

It is certified that error appears in the above-identified patent and that said Letters Patent is hereby corrected as shown below:

On the Title Page

Item (73), should read as follows:
(73) Assignees:
M-I L.L.C., HOUSTON, TEXAS
SHRIEVE CHEMICAL PRODUCTS, INC., THE WOODLANDS, TEXAS Signed and Sealed this
Seventh Day of June, 2022

Katherine Kelly Vidal
Director of the United States Patent and Trademark Office